United States Patent

Andersen et al.

[11] Patent Number: 5,711,430
[45] Date of Patent: Jan. 27, 1998

[54] HANGING RAIL ASSEMBLY

[75] Inventors: Robert Geoffrey Andersen, Camp Hill; Robert Guilford Houston, Tarragindi, both of New Zealand

[73] Assignee: Grabtrak Pty Ltd, Brisbane, Australia

[21] Appl. No.: 290,809

[22] PCT Filed: Feb. 17, 1992

[86] PCT No.: PCT/AU92/00057
    § 371 Date: Sep. 26, 1994
    § 102(e) Date: Sep. 26, 1994

[87] PCT Pub. No.: WO93/16289
    PCT Pub. Date: Aug. 19, 1993

[51] Int. Cl.⁶ .................................................. A47F 7/16
[52] U.S. Cl. .................................................. 211/45; 211/89
[58] Field of Search ............................. 211/45, 46, 47, 211/48, 89; 248/316.2; 40/658

[56] References Cited

U.S. PATENT DOCUMENTS

| | | | |
|---|---|---|---|
| 1,613,354 | 1/1927 | Mathes | 211/89 X |
| 2,590,297 | 3/1952 | Curtis, II | 211/89 X |
| 2,760,288 | 8/1956 | Shoenfeld | 211/45 X |
| 3,168,954 | 2/1965 | Herrmann | 211/89 |
| 3,298,647 | 1/1967 | Shepard | 211/89 X |
| 3,591,013 | 7/1971 | Herrmann | 211/89 X |
| 3,675,782 | 7/1972 | Dudley | 211/89 X |
| 4,629,075 | 12/1986 | Hutten | 211/45 X |

*Primary Examiner*—Korie Chan
*Attorney, Agent, or Firm*—Bauer & Schaffer

[57] ABSTRACT

An elongated hanging rail assembly (10) of the type including a rail (12) having spaced front and rear downwardly converging substantially rigid walls (15,16) defining a longitudinal recess (14) with an open mouth (18) at the bottom, and a plurality of wedging pieces (25) arranged in a longitudinal series and disposed in said recess between said walls so as to grip sheet material (11) inserted into the mouth (18) of the recess, characterized in that the wedging pieces (25) are interconnected loosely in series as a wedging assembly (13) by means of longitudinal restraining means (26) adapted to confine the wedging assembly to a predetermined maximum overall length, while the wedging piece ends which face one another, of any two adjacent wedging pieces (25) in the series, are permitted relative movement in the releasing or disengaging direction whereby a wedging piece may be disengaged when so desired without causing other wedging pieces to be disengaged.

1 Claim, 3 Drawing Sheets

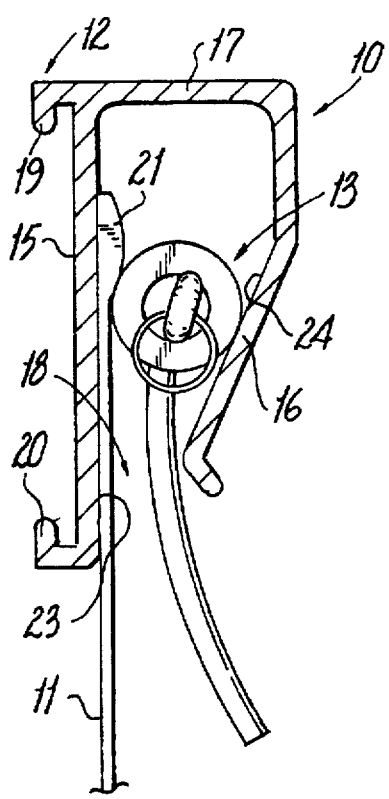
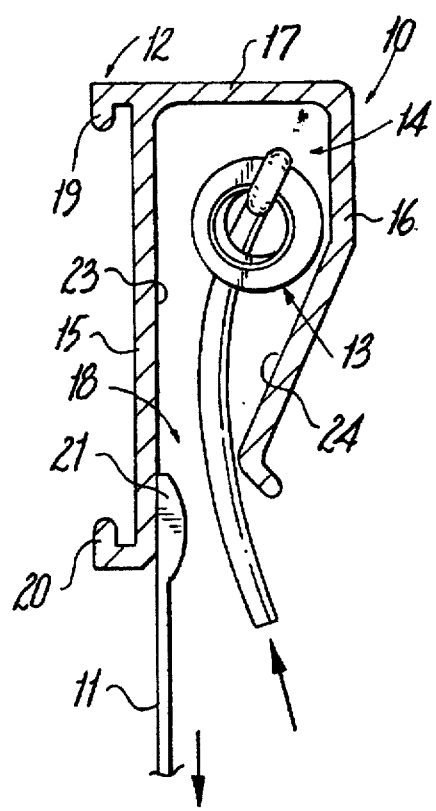
Fig. 5a  Fig. 5b
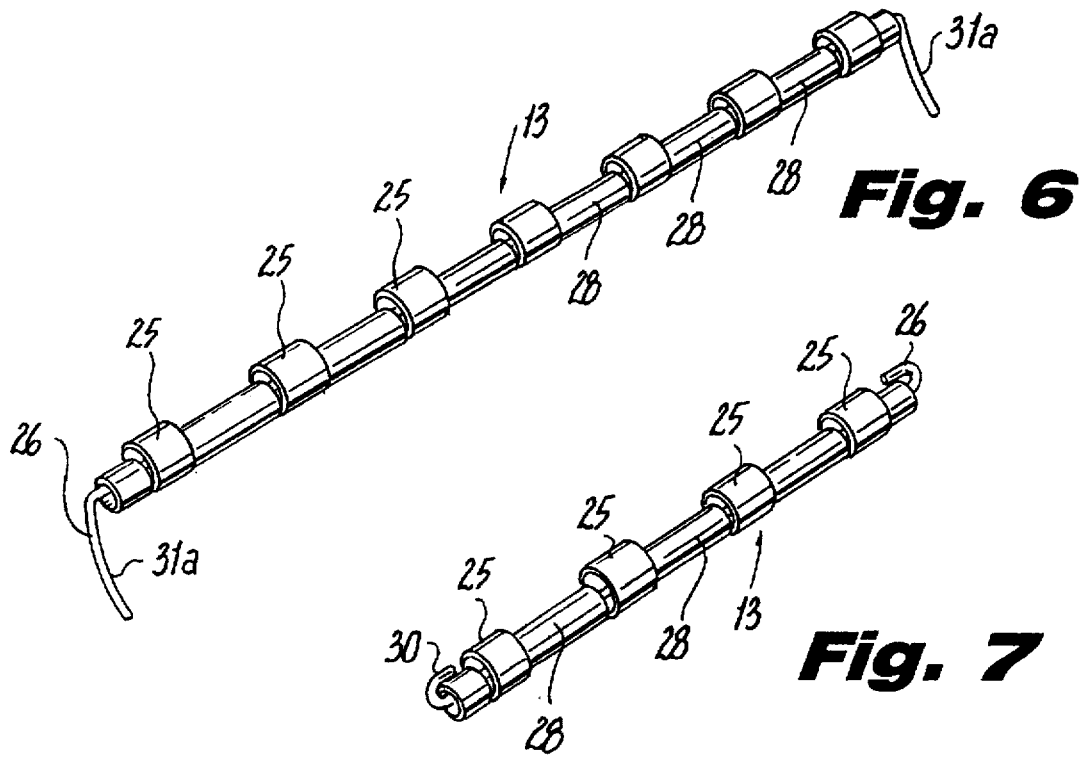
Fig. 6
Fig. 7

5,711,430

HANGING RAIL ASSEMBLY

TECHNICAL FIELD

THIS INVENTION relates to a hanging rail assembly. The invention is particularly concerned with the holding and releasing in clip-like manner of flexible sheet material such as paper sheets or cards, or plastic sheets or metal sheets, but it is not limited thereto, being usable also for rigid wire frames of two-dimensional form, or rigid metal plates or the like of uniform thickness or having minimal beading or flanges. All said materials, of various thicknesses, fall within the general term "sheet-like materials" which the present invention embraces.

BACKGROUND ART

Various types of hanging rail assemblies have been devised in the past for many different purposes, particularly of the type having an elongated rail from which sheets may be suspended being held alongside one another in series, the rail housing a "floating" wedge-type catch means mounted in liftable manner for permitting the receiving of the sheet-like material through a bottom longitudinal mouth of the rail, whereafter the wedge-like catch means returns gravitationally to grasp the sheet in a wedging action. The catch means is retained in a longitudinal chamber in the rail disposed between top wall means and spaced downwardly convergent front and rear walls which define the longitudinal mouth or recess for the sheet material. The wedge-like catch means may take various forms, such as a single roller as described and illustrated in Australian patent specification No. 45,978/85 of J. M. Webber. Such a construction has severe limitations in use, and for this reason it is preferable in most cases to use constructions of the type described and illustrated in U.S. specification No. 3,168,954 of P. Von Hermann which uses a longitudinal series of separate and unconnected wedging pieces so arranged that they function independently to grip various thicknesses of sheet material inserted between the wedging pieces and one wall, without disturbing the functioning of the other wedging pieces.

Notwithstanding the usefulness of some of the prior art, we have found that there remains a need for a hanging rail assembly which may engage and grip sheet-like materials as effectively as any prior proposals but at the same time will have vastly improved release capabilities as compared with earlier forms of hanging rail assemblies. The invention aims also to provide a novel form of hanging rail assembly which may be used for a single sheet-like article if so desired, or may be used for a number of articles alongside one another in series, the articles being of different thicknesses if so required and being able to be separately released without disturbing adjoining sheets. Other objects will become apparent from the concluding discussions herein.

SUMMARY OF THE INVENTION

With the foregoing and other objects in view, the invention resides broadly in an elongated hanging rail assembly of the type including a rail having spaced front and rear downwardly converging substantially rigid walls defining a longitudinal recess with an open mouth at the bottom, and a plurality of wedging pieces arranged in a longitudinal series and disposed in said recess between said walls so as to grip sheet material inserted into the mouth of the recess, characterized in that the wedging pieces are interconnected loosely in series as a wedging assembly by means of longitudinal restraining means adapted to confine the wedging assembly to a predetermined maximum overall length, while the wedging piece ends which face one another, of any two adjacent wedging pieces in the series, are permitted relative movement in the releasing or disengaging direction whereby a wedging piece may be disengaged when so desired without causing other wedging pieces to be disengaged.

Preferably the hanging rail assembly is provided with manually operable release means, operable to raise selectively part or all of the wedging assembly in disengaging action. The release means may, for example, include a lifting handle at the middle of the wedging assembly or one handle at each end. On the other hand, the wedging assembly may have a relatively rigid restraining means, such as self-supporting connecting rod, with lost-motion arrangements, so that no manually operable release means is necessary, direct pulling or sliding motion causing disengagement of the sheet material. Then again, the same type of relatively rigid restraining means can be fitted with handles for preference, depending from the connecting rod at its middle or at each end.

In one of the alternative embodiments of the invention, the restraining means of the wedging assembly may suitably include flexible cable, chain or other link means between adjacent wedging pieces. In one such embodiment, the wedging assembly is arranged to enable it to be pulled taut by its ends to align the wedging pieces whereby they may be manually lifted in unison in disengaging actions. In that event, each wedging piece may suitably comprise a tubular roller turnable closely about a cylindrical core piece, the link means being connected between the ends of adjacent core pieces.

In our preferred constructions, the restraining means of the wedging assembly comprises an elongate connecting rod passing through oversize apertures of the wedging pieces to afford lose-motion actions for each wedging piece, the rod being liftable from normal repose position for a distance before being operative to lift the respective wedging pieces. Preferably too, the wedging pieces are loosely spaced apart by spacer members having apertures through which the connecting rod extends, the spacer members being of lesser thickness in the engaging or disengaging direction of movement of the wedging assembly so as not to impede the engagement of each wedging piece with the rail.

As previously mentioned, the connecting rod of the just-described embodiment may have one or more handles operable to raise selectively part or all of the wedging assembly, in which case the or each handle may suitably extend down from the connecting rod and then curve forwardly at its bottom so that upward lifting urges the wedging assembly normally forwardly in the recess when the sheet material is gripped between the wedging assembly and the rear wall of the rail. Where spacer members are provided, each may suitably be of tubular form having an outside diameter greater than the internal diameter of each wedging piece, the latter also preferably being of cylindrical form in practice.

The invention also provides a novel and useful form of rail made as a two-piece construction, the front and rear walls being on the respective parts of the rail and adapted to be joined by interconnecting to wall portions of the two rail parts. The latter may suitably be metal or plastic extrusions provided with top flange means permitting their interconnection as a snap fit. Other features of the invention will be hereinafter apparent.

BRIEF DESCRIPTION OF THE DRAWINGS

In order that the invention may be more readily understood and put into practical effect, reference will now be made to the accompanying drawings, wherein:

FIG. 5a is a sectional end view of the hanging rail assembly of FIG. 1, in operative or engaged attitude to hold a metal sheet having a beaded edge;

FIG. 5b is the same as FIG. 5a but illustrating the releasing or disengaging actions;

FIG. 6 shows in perspective view a wedging assembly similar to that of FIGS. 1 and 2 but modified and provided with two lifting handles;

FIG. 7 shows in perspective view another type of wedging assembly not fitted with handle means;

DESCRIPTION OF THE INVENTION

Figure 1:
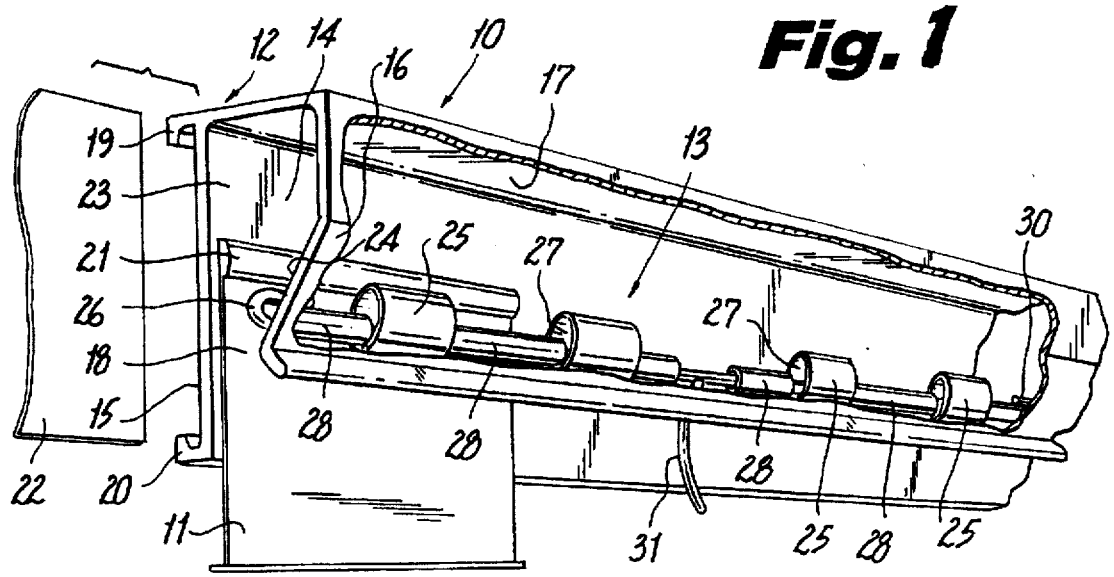
FIG. 1 shows in front perspective view, partly broken away for clarity, one form of hanging rail assembly in accordance with the invention.
Figure 2:
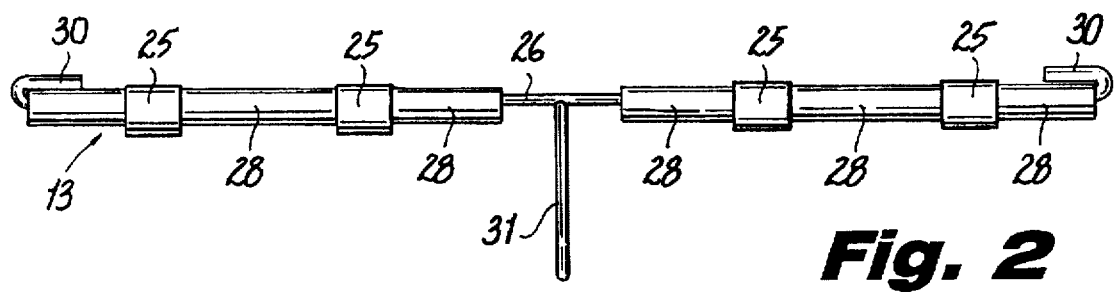
FIG. 2 shows in front elevation the wedging assembly of the apparatus of FIG. 1.
Figure 3:
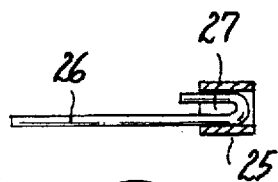
FIG. 3 shows the relationship between one wedging roller and the connecting rod of FIGS. 1 and 2 for the purpose of assembling same.
Figure 4A:
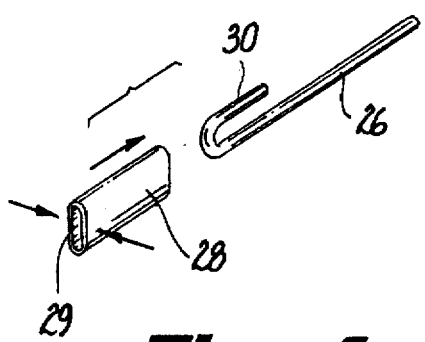
FIG. 4a and 4b illustrate the assembling of a spacer member on the connecting rod in two stages.
Figure 4B:
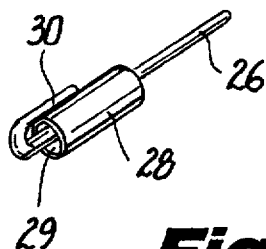

Referring initially to FIGS. 1 to 5 of the drawings, the hanging rail assembly indicated by the numeral 10 is used in this instance to engage and support metal sheet 11 and comprises two main parts, namely a metal rail 12 and a wedging assembly 13. The metal sheet 11, which has an edge bead 21, could instead be a metal or plastic wire frame of substantially flat or two-dimensional form or it could be a simple paper sheet or a thin or thick card. Likewise, the hanging rail assembly components may be made of any desired materials suitable for the purpose, the rail 12 normally being of extruded aluminium or the like. In this instance, the rail 12 has a recess 14 defined between longitudinal walls comprising a rear vertical wall 15, a front inclined wall 16 and a top wall 17, the recess 14 having a mouth 18 where the lower ends of the walls 15 and 16 terminate in spaced relationship. The rear wall 15 has upper and lower retaining flanges 19 and 20 to receive a facing sheet 22 if so desired. The wedging actions in the recess 14 take place between the front vertical face 23 of the rear vertical wall 15 and the inclined rear or inner face 24 of the front wall 16.

In the embodiment of FIGS. 1 to 5, the wedging assembly 13 includes four wedging pieces in the form of tubular rollers 25 arranged as two pairs as illustrated and mounted on a connecting rod 26 passing through oversize bores 27 so that lost-motion actions will be achieved as apparent from FIGS. 5a and 5b. Between the rollers 25 are spacer members in the form of tubes 28 of outside diameter greater than the internal diameters of the bores 27 and each having a bore, 29. The connecting rod 26 has bent-back end portions 30 which may be passed closely through the bore 27 of a wedging roller 25 as apparent from FIG. 3, without distortion of the roller 25, while FIG. 4a shows that a bent end 30 may be passed through a spacer tuber 28 if the latter is digitally distorted, being made of a firm but resilient plastic or the like for that purpose. The spacer 28 can then resume its shape to be operative as shown in FIG. 4b.

Secured by welding or otherwise to the middle of the connecting rod 26 is a handle arm 31 which may be gripped manually for raising of the wedging assembly 13 as a whole or at one end or the other thereof. This action will be clearer from FIGS. 5a and 5b, the former showing the sheet 11 gripped against the face 23 and the wedging roller 25 with the latter also engaging the inclined face 24 at the mouth 18 of the recess 14. This is the "repose" position for the spacers 28 which are lowermost and supported by the connecting rod 26, the latter being lowermost in the oversize apertures or bores 27 of the wedging rollers 25. Upon lifting the handle arm 31 the spacers 28 will be raised without changing disposition on the connecting rod 26, while the latter lifts through a lost-motion action so that the "slack" is taken up before the wedging rollers 25 are lifted to release the sheet 11 and thus allow it to be withdrawn, as will be clear from FIG. 5b, the mouth 18 being wide enough to cater for the bead 21 and for various thicknesses of sheet material. It will be noted that the handle arm 31 is curved so that lifting enables the operator to ensure that the rollers 25 are kept towards the front wall 16 to facilitate release actions.

Various modifications of the invention are shown in FIGS. 6 to 11 in order to illustrate the variations which are possible within the broad idea, and corresponding components have been given the same numerals as in FIGS. 1 to 5. FIG. 6 show a longer wedging assembly 13 having seven wedging rollers 25 on a connecting rod 26 which terminates at each end in a handle arm 31a, spacer members 28 being provided as before. The wedging assembly 13 of FIG. 7 is substantially the same as that of FIGS. 1 to 5, having four rollers 25 on a connecting rod 26, with spacers 28, but in this instance, there is not considered to be a need for a handle. With slight lifting and sideways movement of the sheet, the latter may be removed from the hanging rail assembly which uses the embodiment of FIG. 7, but handle means are to be preferred when a larger assembly is involved with a number of sheets being mounted alongside one another.

Figure 8:
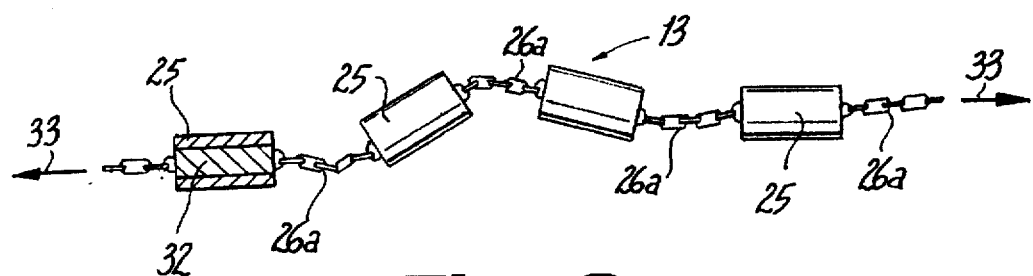
FIG. 8 shows yet another form of wedging assembly according to a modification of the invention.

FIG. 8 shows a modified form of wedging assembly 13 which has limited application by comparison with those earlier described, but it illustrates the use of restraining means equivalent to the connecting rod to provide a maximum length for the assembly when adding together the wedging rollers 25 and their connecting links 26a which may be of chain or cable or any other material allowing flexibility. In this instance, each roller 25 is turnable about a tubular core member 32, each end of which faces another roller 25 in the series and is connected to the next core member. The arrows 33 in FIG. 8 show that the assembly 13 can be extended by pulling both ends at the same time to make it taut so that it can be manipulated to provide a releasing action. This figure illustrates the major feature of connecting together the wedging members within a restrained maximum length while having flexibility in that the axes of the several wedging members can be shifted laterally of their longitudinal alignment and also altered as to angular relationship in a common plane.

Figure 9:
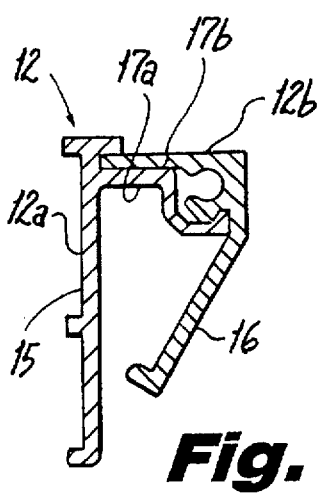
FIG. 9 is a sectional end view of a modified form of rail having a two-piece snap-join construction.
Figure 10:
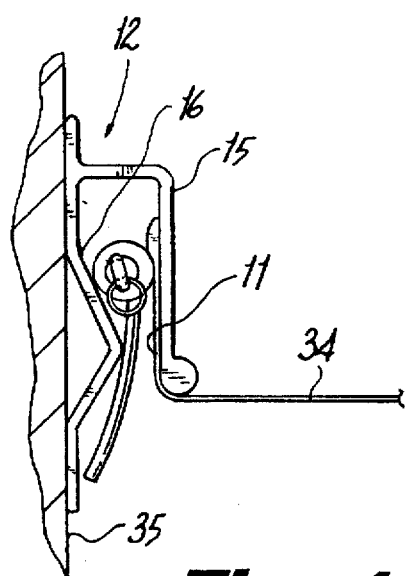
FIG. 10 shows in end view a form of the invention used to provide a releasable support for a rigid shelf.

When the rail is of small cross-section, or if dictated by other factors, embodiments such as that of FIG. 9 are useful, the rail 12 in this instance having two interconnected parts 12a and 12b providing rear wall 15 and front wall 16 respectively, the top walls 17a and 17b being connected in a snap fit, especially when the sections are suitably of extruded aluminium or the like. In FIG. 10, the invention provides a rail 12 used for supporting the flange sheet 11 of a metal shelf 34, with some obvious rearrangements of the walls 15 and 16 to suit the fact that the assembly is used on a wall 35.

Figure 11:
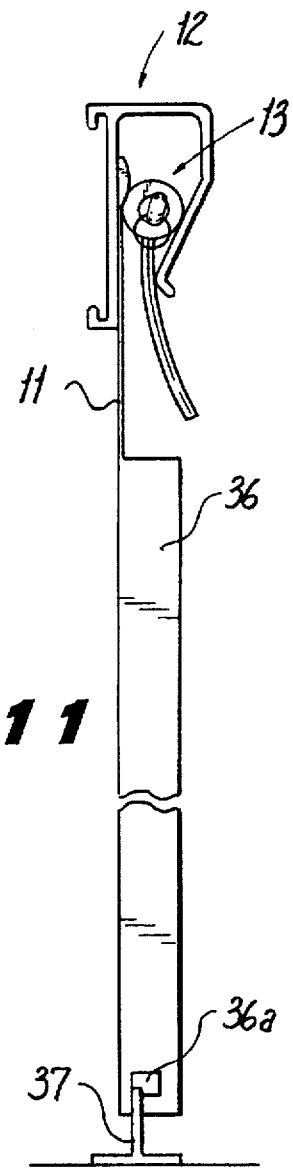
FIG. 11 is similar to FIG. 5a but illustrating the use of the invention in the mounting of a partition.

There is shown in FIG. 11 the same type of hanging rail assembly as in FIGS. 1 to 5 except that the sheet 11, held releasably by the rail 12 and wedging assembly 13, is an upper mounting for a long vertical partitioning panel 36 of desired length and having its lower end fitted with groove means 36a to accommodate floor-locating members 37. This serves to illustrate how readily the invention provides are leasable arrangement in any one of numerous applications, with advantages in partitioning arrangements, for example, compared with many known systems.

While the embodiments as described and illustrated will therefore be found very effective in achieving the objects for which the invention has been devised, they serve to illustrate that the invention may be subject to all such variations as will be apparent to persons skilled in the art and residing within the scope and ambit of the invention as defined by the appended claims.

We claim:

1. An elongated hanging rail assembly of the type including a rail of selected length adapted to be mounted substantially horizontally in use, said rail having spaced front and rear downwardly converging substantially rigid walls defining a longitudinal recess with an open mouth at the bottom of said rail and a wedging assembly disposed in said recess between said walls so as to grip sheet material inserted into the mouth of said recess from below;

characterized in that the wedging assembly comprises a series of alternating wedging pieces having oversized central apertures, spacer members interposed between said wedging pieces having central apertures smaller than the oversized aperture, and a longitudinal connecting rod passing loosely through the oversize apertures in the wedging pieces and through said spacer members therebetween whereby the wedging assembly has said wedging pieces spaced from one another along the connecting rod to a predetermined maximum overall length related to the length of the connecting rod and being urged by gravity towards their lowermost gripping positions; and further characterized in that a manual release handle is secured to the connecting rod, clear of said wedging pieces, and is so made and arranged as to extend downwards and loosely through the open mouth from the recess and usable for manual lifting of the connecting rod and wedging pieces thereon from below said mouth for releasing the gripped sheet material.

\* \* \* \* \*